(12) United States Patent
Baylis (10) Patent No.: US 7,228,543 B2
(45) Date of Patent: Jun. 5, 2007

(54) TECHNIQUE FOR REACHING CONSISTENT STATE IN A MULTI-THREADED DATA PROCESSING SYSTEM

(75) Inventor: Charles G Baylis, Cambridge (GB)

(73) Assignee: ARM Limited, Cambridge (GB)

( * ) Notice: Subject to any disclaimer, the term of this patent is extended or adjusted under 35 U.S.C. 154(b) by 854 days.

(21) Appl. No.: 10/350,355

(22) Filed: Jan. 24, 2003

(65) Prior Publication Data

US 2004/0148603 A1 Jul. 29, 2004

(51) Int. Cl.
*G06F 9/455* (2006.01)
*G06F 11/00* (2006.01)

(52) U.S. Cl. .............. 718/1; 703/26; 703/27; 714/13; 714/15; 714/35

(58) Field of Classification Search .......... 718/100
See application file for complete search history.

(56) References Cited

U.S. PATENT DOCUMENTS 5,963,741 A * 10/1999 Horikawa ............ 717/111
6,314,560 B1 * 11/2001 Dunn et al. ............ 717/153
6,598,154 B1 * 7/2003 Vaid et al. ............ 712/237
6,795,966 B1 * 9/2004 Lim et al. ............ 718/1
6,799,315 B2 * 9/2004 Waki et al. ............ 717/148
6,961,935 B2 * 11/2005 Torii ............ 718/100
7,080,362 B2 * 7/2006 Patel et al. ............ 717/139
2004/0015967 A1 * 1/2004 Morris ............ 718/100

\* cited by examiner

*Primary Examiner*—Meng-Al T. An
*Assistant Examiner*—Eric C. Wai
(74) *Attorney, Agent, or Firm*—Nixon & Vanderhye P.C.

(57) ABSTRACT

A data processing system is arranged to execute multiple program threads, with each program thread comprising program thread instructions. An interpreter is operable, during execution of each program thread, to employ a table pointer to reference a table to determine for a current program thread instruction a sequence of native instructions to be executed by the processor core to effect execution of that current program thread instruction. A consistency module is provided which is responsive to occurrence of a predetermined event to cause the table pointer to be manipulated, such that for a predetermined number of the program threads, the interpreter will be operable to associate a subsequent program thread instruction with a predetermined routine to be executed by the processor core, the predetermined routine being operable to cause the state of the corresponding program thread to be made available for subsequent reference.

27 Claims, 8 Drawing Sheets

ARM INSTRUCTIONS ADDED TO ARM CODE FOR CERTAIN JAVA INST[NS]

```
LDR    r0, [Y]
CMP    r0, #X
BEQ    rendezvous
```

ARM INST$^N$ ADDED TO ARM CODE FOR CERTAIN JAVA INST$^{NS}$

LDR   r5, [ee, # JT_OFFSET]

ARM INST$^N$ ADDED TO ARM CODE FOR CERTAIN JAVA INST$^{NS}$

LDR    r5, [ee, # JT_OFFSET]

FIG. 8B

TECHNIQUE FOR REACHING CONSISTENT STATE IN A MULTI-THREADED DATA PROCESSING SYSTEM

BACKGROUND OF THE INVENTION

1. Field of the Invention

The present invention relates to the field of data processing systems. More particularly, the present invention relates to techniques for reaching consistent state in a multi-threaded data processing system.

2. Description of the Prior Art

A data processing apparatus will typically include a processor core that is operable to execute native instructions from a native instruction set. Some of the applications that may be run by the data processing apparatus may include multiple program threads, and it is possible that those program threads may consist of instructions that are not native instructions, and hence cannot directly be executed on the processor core. In such situations, it is known to provide an interpreter which is operable to determine for a current program thread instruction a sequence of native instructions to be executed by the processor core in order to execute that current program thread instruction.

One example of such an approach is where the program thread instructions are from an instruction set that uses a stack-based approach for storing and manipulating data items upon which those instructions act, whilst the native instructions executable by the processor core are from an instruction set that uses a register-based approach for storing and manipulating the data items.

One example of a stack-based instruction set is the Java Virtual Machine instruction set as specified by Sun Microsystems Inc. The Java programming language seeks to provide an environment in which computer software written in Java can be executed upon many different processing hardware platforms without having to alter the Java software. Another example of a stack-based instruction set is the Java Card instruction set as specified by Sun Microsystems Inc., which is a version of Java which has been designed for use within smart cards and similar devices, i.e. devices which are relatively cheap and consume relatively low power.

An example of register-based systems are the ARM processors produced by ARM Limited of Cambridge, England. ARM instructions execute operations (such as mathematical manipulations, loads, stores, etc) upon operands stored within registers of the processor specified by register fields within the instructions.

It is becoming more desirable for data processing systems designed to execute register-based instructions to support execution of stack-based instructions. An example of such a data processing system is described in UK patent application no. 0024404.6. As described in that patent application, stack-based instructions are converted into a sequence of operations to be executed by the processor core upon registers within a register bank. The data items on the stack that are required by those operations are stored from the stack into registers of the register bank so that they are available to the processor core.

When such a data processing system is operating in a multi-threaded environment, some events may occur that require a number of the program threads (typically all of the program threads) to be stopped at a point where they will all then be in a consistent state. Such events include garbage collection to free up space in the data heap shared by the program threads, thread switching when performed by software associated with the interpreter (rather than being performed at the operating system level), certain debug events, etc.

Since at the time the event occurred, each of the program threads may be part way through execution of a sequence of native instructions used to execute a current program thread instruction, it is not appropriate to immediately stop each of the program threads, since if that were done the state of one or more of the program threads may be in some intermediate state which would not be consistent with the state that would actually arise upon completion of execution of that current program thread instruction. For any particular program thread, a consistent state for that program thread is reached at points where a current program thread instruction has completed execution, and a next program thread instruction has not yet begun execution. It is possible for the consistent state to remain a few native instructions into the execution of a program thread instruction, if those instructions do not modify the state.

One way in which this problem has been addressed in prior art techniques is to provide a predetermined routine, also referred to herein as a rendezvous routine, which when executed for a particular program thread will cause the state of that thread to be stored from the processor core's internal memory (for example the processor core's working registers in the example of a register-based processor core) to a block of memory storing an execution environment for that program thread. This execution environment will typically be provided within a memory accessible by other threads, for example a portion of Random Access Memory (RAM) used to store the execution environment of each thread, and accessible by all threads. To ensure that this rendezvous routine is only actioned at a point where the state will be a consistent state, a known prior art technique is to include within the native instruction sequences associated with particular program thread instructions a sequence of native instructions that will conditionally cause a branch to the rendezvous routine if an event requiring the threads to be stopped has occurred.

When such an event does occur, a particular memory location is written with a particular value (also referred to herein as the "rendezvous flag"), and the purpose of the extra sequence of native instructions added to the native instruction sequences for particular program thread instructions is to cause the data at that memory location to be loaded into a register, for the contents of that register to be compared with the predetermined value, and for the process to branch to the rendezvous routine if the comparison indicates equality between the values (i.e. indicates that the memory location has been written with that particular value, thereby indicating that the thread needs to be stopped, and that accordingly execution of the rendezvous routine is appropriate). These extra native instructions are written such that the rendezvous flag is polled at the end of the native instruction sequences for particular program thread instructions since at that point the state will be in a consistent state (i.e. the corresponding program thread instruction will have completed execution).

As will be appreciated by those skilled in the art, this approach involves adding a number of instructions (in one known implementation three instructions) to the native instruction sequence for a number of the program thread instructions, and these extra instructions have to be executed each time that corresponding program thread instruction needs to be executed, irrespective of whether the rendezvous routine does in fact need to be performed. This significantly impacts the performance of execution of such program thread instructions.

Ideally, to enable the system to react most quickly to an event requiring the threads to be stopped, these extra native instructions would be added to the native instruction sequence for every program thread instruction. However, that would adversely impact the performance to an unacceptable degree, and accordingly a compromise approach is typically employed where these extra native instructions are only added to the native instruction sequences corresponding to certain program thread instructions, for example method invocation instructions, backwards branches, etc. The rationale behind this compromise approach is to choose some instructions so that the period between polling the rendezvous flag is not too great. For example, polling in backwards branches means that all loops include at least one check. As another example, some Virtual Machines (VMs) may require the rendezvous flag to be checked in some instructions to ensure correct operation.

Nevertheless, it will be appreciated that there is still overall a significant performance hit in execution of the multiple program threads, since these extra instructions will still be executed every time the relevant program thread instructions are executed and irrespective of whether an event has in fact arisen that requires the rendezvous routine to take place.

Accordingly, it would be desirable to provide an improved technique which, upon the occurrence of an event requiring the threads to be stopped, enables the rendezvous routine to be invoked by each thread when that thread's state is in a consistent state.

SUMMARY OF THE INVENTION

Viewed from a first aspect, the present invention provides a data processing apparatus for executing multiple program threads, each program thread comprising program thread instructions, the apparatus comprising: a processor core operable to execute native instructions; an interpreter operable, during execution of each program thread, to employ a table pointer to reference a table to determine for a current program thread instruction a sequence of native instructions to be executed by said processor core to effect execution of that current program thread instruction; and a consistency module responsive to occurrence of a predetermined event to cause the table pointer to said table to be manipulated, such that for a predetermined number of said program threads, the interpreter will be operable to associate a subsequent program thread instruction with a predetermined routine to be executed by the processor core, the predetermined routine being operable to cause the state of the corresponding program thread to be made available for subsequent reference.

In accordance with the present invention, the interpreter employs a table pointer to reference a table in order to determine for a current program thread instruction a sequence of native instructions to be executed by the processor core. Upon occurrence of a predetermined event that requires a predetermined number of the program threads to be stopped, a consistency module is used to cause the table pointer to the table to be manipulated, such that when the interpreter is reviewing a subsequent program thread instruction from any of the program threads to be stopped, it will associate a predetermined routine with that subsequent program thread instruction, this predetermined routine being operable to cause the state of the corresponding program thread to be made available for subsequent reference.

By this approach, once an event has occurred that requires a predetermined number of the program threads to be stopped (in preferred embodiments all of the program threads), the predetermined routine (also referred to herein as the rendezvous routine) will be automatically invoked when a subsequent program thread instruction is reviewed by the interpreter. It should be noted that at this point the corresponding thread will be in a consistent state, since the preceding program thread instruction will have completed execution, and this subsequent program thread instruction will not yet have begun execution. By this approach, the need to include a series of native instructions within the native instruction sequences for particular program thread instructions in order to speculatively poll a memory location in order to determine whether the rendezvous routine should be invoked is removed, and accordingly the present invention significantly alleviates the performance problems associated with that prior art technique.

It will be appreciated by those skilled in the art that the table used by the interpreter may take a variety of forms. In one embodiment, the table contains for each program thread instruction a code pointer pointing to a corresponding sequence of native instructions. In such embodiments, the consistency module is preferably operable in response to occurrence of said predetermined event to cause the table pointer to be replaced by a table pointer to a replacement table, the replacement table containing for each program thread instruction a code pointer pointing to said predetermined routine.

In preferred embodiments, the consistency module is arranged to store the table pointer to the replacement table within the execution environment for each of the predetermined number of program threads, and then to include within the sequence of native instructions for certain program thread instructions a single instruction to load that new table pointer into the relevant register of the processor core, so that the interpreter will then use that new table pointer when reviewing a subsequent program thread instruction for any of the predetermined number of program threads that are to be stopped.

In an alternative embodiment, the table has for each program thread instruction a block containing the corresponding sequence of native instructions. In such embodiments, each block is preferably arranged to further contain at a predetermined entry an instruction for branching to the predetermined routine, and the consistency module is preferably operable in response to occurrence of said predetermined event to cause the table pointer to be modified so that when the interpreter subsequently references the table using the modified table pointer, the instruction for branching to said predetermined routine will be associated with the subsequent program thread instruction.

More particularly, in one embodiment, the instruction for branching to said predetermined routine has a size of X bytes, the predetermined entry containing the instruction for branching to said predetermined routine is the final entry in each block, and the consistency module is operable to modify the table pointer by subtracting X bytes from the table pointer.

In an alternative embodiment, the instruction for branching to said predetermined routine has a size of X bytes, the predetermined entry containing the instruction for branching to said predetermined routine is the final entry in each block, each block has a size of Y bytes, and the consistency module is operable to modify the table pointer by adding Y-X bytes to the table pointer.

In one embodiment, each native instruction has a size of X bytes, whilst in other embodiments variable length native instructions may be used.

In preferred embodiments, the consistency module is preferably arranged to store the modified pointer to the relevant entry of the execution environment for each of the predetermined program threads, and a single load instruction is then added to the sequence of native instructions for certain of the program thread instructions to cause that modified pointer to be loaded into the appropriate register of the processor core, such that the interpreter will use that modified pointer when reviewing a subsequent program thread instruction from any of those predetermined number of program threads.

It will be appreciated that there are a number of different predetermined events that may require one or more of the program threads to be stopped, and hence will require the consistency module to manipulate the table pointer. In preferred embodiments, each of the program threads share a data heap, and the predetermined event is the determination that a garbage collection process is required to be performed upon that data heap. Before any such garbage collection is performed, it is necessary that each of the program threads sharing that data heap to reach a consistent state, and that that consistent state is made available to the garbage collection routine so that it can ensure that any garbage collection performed on the shared data heap takes into account the current consistent state of each thread.

In one embodiment, switching between the various program threads is performed under the control of the operating system. However, in an alternative embodiment, switching between the program threads is performed by software associated with the interpreter. In such instances, it is necessary that each of the threads reaches a consistent state, and is stopped at that consistent state, prior to the switching being performed, and accordingly in such embodiments, the predetermined event is the requirement for a switch between program threads.

In such embodiments, there are a number of known ways in which it can be determined that a switch between program threads is appropriate. One simple approach is to use a timer, so that each thread is allocated a certain amount of time. In such embodiments, it will be appreciated that the predetermined event can be deemed to have occurred upon expiry of the timer.

In preferred embodiments, the data processing apparatus further comprises a debug interface for interfacing with a debugging application used to debug program threads being executed by the data processing apparatus. As will be appreciated by those skilled in the art, such debugging applications typically use techniques such as break points and the like to step through execution of particular applications. When a break point is asserted in a particular program thread, it is again necessary that the other threads are only stopped once they have reached a consistent state and hence the technique of the present invention may be used in such scenarios. Accordingly, in such embodiments where debugging is being performed, the predetermined event is a debug event that requires access to the state of one or more of the program threads.

It will be appreciated by those skilled in the art that the consistency module may be arranged to be responsive to any number of predetermined events, and hence, as an example, could be arranged to be responsive to any of the above described predetermined events to cause the table pointer to be manipulated. Further, it will be appreciated that the way in which the table pointer is manipulated can be made dependent on the type of predetermined event that has occurred. However, in an alternative embodiment, the consistency module will be arranged to perform the same manipulation of the table pointer irrespective of the type of predetermined event, such that the same predetermined routine is called. In this embodiment, the predetermined routine would then independently be informed of the type of predetermined event.

In preferred embodiments, each program thread has associated therewith an execution environment stored in memory external to the processor core and the predetermined routine is operable to cause the state of the corresponding program thread to be stored from registers of the processor core to the execution environment. Considering the example where the program thread instructions are Java Virtual Machine instructions, the state that may be stored to the execution environment may comprise the program counter, a stack pointer, a frame pointer, a constant pool pointer and a local variable pointer. It will be appreciated that other state could also be stored as required.

It will be appreciated that the program thread instructions may take a variety of forms. However, in preferred embodiments, the program thread instructions are Java bytecodes. Furthermore, in such preferred embodiments, the interpreter is provided within a Java Virtual Machine arranged to be executed on the processor core.

In such embodiments, the processor core preferably has a set of registers in which to store data required by the processor core, a subset of these registers being allocated for storing data relating to the Java Virtual Machine, and the state to be made available for subsequent reference comprises the contents of said subset of registers.

Viewed from a second aspect, the present invention provides a method of operating a data processing apparatus to execute multiple program threads, each program thread comprising program thread instructions, the apparatus having a processor core operable to execute native instructions, and the method comprising: (i) during execution of each program thread, employing a table pointer to reference a table to determine for a current program thread instruction a sequence of native instructions to be executed by said processor core to effect execution of that current program thread instruction; and (ii) responsive to occurrence of a predetermined event, manipulating the table pointer to said table, such that for a predetermined number of said program threads, subsequent iterations of said step (i) will cause a subsequent program thread instruction to be associated with a predetermined routine to be executed by the processor core, the predetermined routine being operable to cause the state of the corresponding program thread to be made available for subsequent reference.

Viewed from a third aspect, the present invention provides a computer program product carrying a computer program for controlling a computer to perform the method in accordance with the second aspect of the present invention.

BRIEF DESCRIPTION OF THE DRAWINGS

The present invention will be described further, by way of example only, with reference to a preferred embodiment thereof as illustrated in the accompanying drawings, in which.

DESCRIPTION OF A PREFERRED EMBODIMENT

For the purposes of describing a preferred embodiment of the present invention, a data processing system will be considered in which multiple program threads consisting of Java bytecodes are arranged to be executed on a register-based processor core, for example an ARM processor produced by ARM Limited of Cambridge, England.

Figure 1:
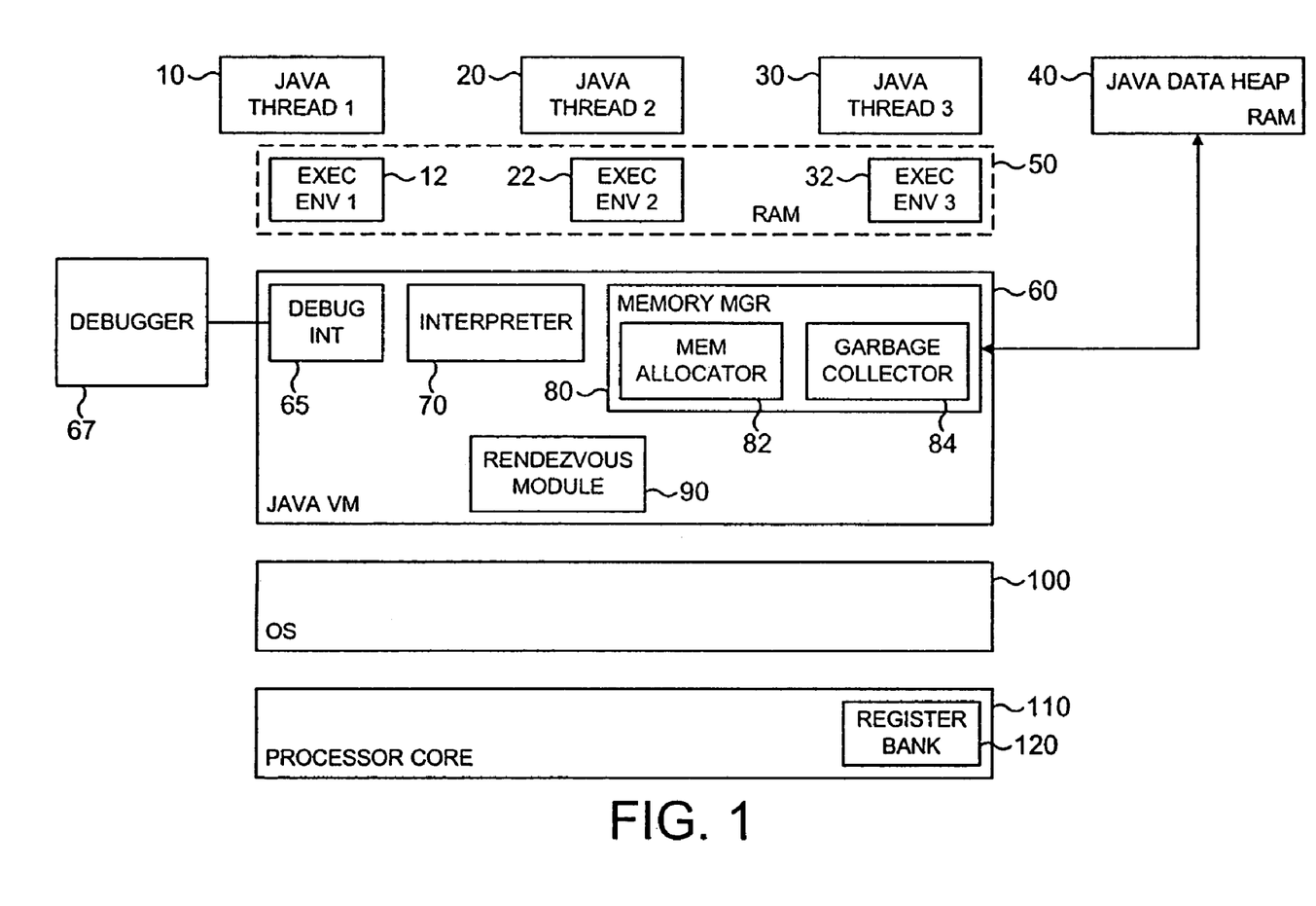
FIG. 1 is a block diagram of a data processing system in which the techniques of preferred embodiments of the present invention may be employed.

As shown in FIG. 1, three Java program threads 10, 20, 30 are shown, each of which has associated therewith an execution environment 12, 22, 32, respectively, the execution environment being stored within a portion of memory 50, which may for example be RAM. Each of the Java program threads 10, 20, 30 share a Java data heap 40, which may be provided in memory such as RAM, this data heap 40 being used to store the various data values required by the Java threads. A Java Virtual Machine 60 is also provided. As will be appreciated by those skilled in the art, a Virtual Machine is a simulated computer that runs on a host computer but behaves as if it is a separate computer. The Java Virtual Machine hence works as a self-contained operating environment to run Java applications, which are then run independently from the host operating system. The Java VM 60 hence sits between the host operating system 100 and the Java program threads 10, 20, 30. All this software is then run on the processor core 110 with the data values required when executing instructions on the processor core being stored within the register bank 120.

As will be appreciated by those skilled in the art, the Java VM 60 contains a number of modules. In FIG. 1, only those modules relevant to a description of the preferred embodiment of the present invention are included. A key module of the Java VM 60 is the interpreter 70, which is arranged to determine with reference to a table a sequence of native instructions to be executed on the processor core to effect execution of each program thread instruction. Hence, when Java thread 1 is being executed, the interpreter 70 will review a current Java bytecode within Java thread 1 and determine a sequence of native instructions, for example ARM instructions, to be executed on the processor core 110 in order to effect execution of that Java bytecode. A similar table look up process will then be employed for subsequent Java bytecodes from Java thread 1, or when a switch occurs to another Java thread, the interpreter will then perform a similar look up process for the Java bytecodes of that other Java thread now executing on the processor core.

Figure 2A:
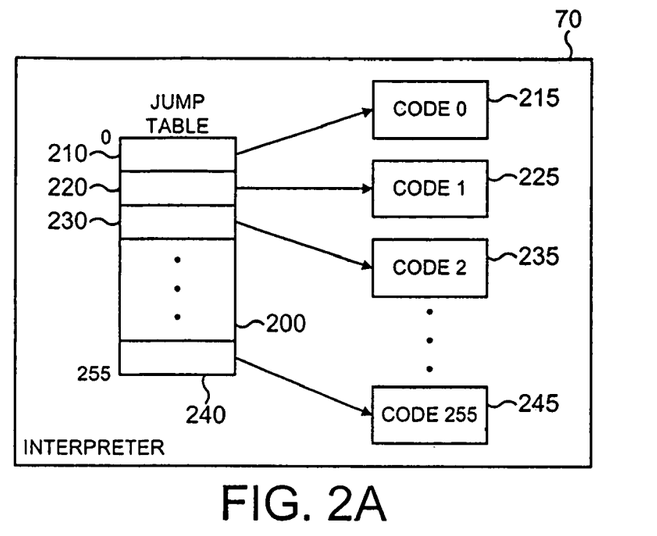
FIG. 2A is a diagram schematically illustrating one type of table which may be employed within the interpreter of FIG. 1.

FIG. 2A illustrates one format of table that may be used within the interpreter 70. This table 200 is referred to as a jump table, and includes an entry for each Java bytecode that contains a pointer to a corresponding sequence of native instructions that need to be executed to effect execution of that Java bytecode. Hence, as an example, Java bytecode 0 will have an entry 210 in the table which includes a pointer to native code 0 215. Similarly, Java bytecode 1 will have an entry 220 which includes a pointer to native code 1 225. Hence, if bytecode number n is to be executed, the address for the corresponding sequence of native code instructions is read from the nth entry in the table into the program counter so as to cause the corresponding sequence of native instructions to be executed within the processor core 110.

Figure 2B:
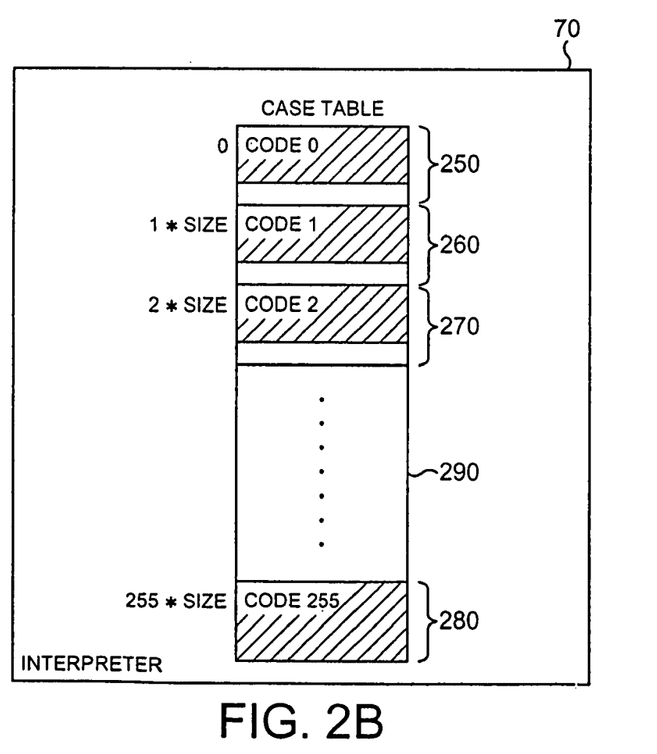
FIG. 2B is a diagram illustrating an alternative type of table which may be employed within the interpreter of FIG. 1.

FIG. 2B illustrates an alternative form of table, which will be referred to herein as a case table. Case table 290 (also referred to as a "cheese grater") stores the native code sequences in fixed sized chunks 250, 260, 270, 280 within the table, and accordingly the native code required to execute the nth bytecode is computed by adding n*SIZE (where "SIZE" is the size of each chunk) to the table pointer and storing the result in the program counter. It has been found that this case table mechanism is in certain embodiments faster than the earlier described jump table approach.

In addition to the interpreter 70, the Java VM 60 also includes a memory manager 80 which incorporates within it a memory allocator 82 and a garbage collector 84. As will be appreciated by those skilled in the art, certain Java bytecodes will require memory to be allocated within the data heap 40 for containing data required by the associated Java thread. This job is performed in a known manner by the memory allocator 82. However, when the data heap 40 becomes full, before any subsequent memory allocation can be performed by the memory allocator 82, the garbage collector routine 84 is first required to free up some space within the data heap 40, for example by deleting data values no longer required by the various Java threads 10, 20, 30. Hence, when the garbage collector is required, it is first necessary to stop each of the Java threads 10, 20, 30 at a point where each thread is at a consistent state, and for that consistent state to be then made available to the garbage collector 84 for use in determining which data values can be removed from the data heap 40 to free up space within the data heap.

As will be described in more detail later, this is achieved by causing the rendezvous module 90 to manipulate the table pointer for the table used by the interpreter, such that following completion of a current Java bytecode, and prior to execution of a subsequent Java bytecode, each Java thread executes a rendezvous routine to store its corresponding consistent state within the associated execution environment 12, 22, 32, whereafter that state information is then available to the garbage collector 84.

The Java VM 60 may also include a debug interface 65 for interfacing with an external debugger 67. The debugger 67 may be provided on the same computer as that being used to process the Java threads, or alternatively may be provided on a separate computer, for example a separate PC. When a break point is reached during execution of a particular Java thread, then it is necessary to stop execution of all of the other threads at a consistent point to allow analysis of the state of the various Java threads. Again, this is achieved by causing the rendezvous module 90 to invoke the same process as is invoked when garbage collection is required, to cause the consistent state of each thread to be stored into the corresponding execution environment 12, 22, 32, after which that state can be analysed by the debugger 67.

In one embodiment of the present invention, the operating system 100 is arranged to run the Java VM 60 multiple times, once for each Java thread 10, 20, 30, and the switching between threads is performed at the operating system level. In this embodiment, it is again necessary for all of the Java threads to be stopped when their state is in a consistent state, prior to switching between threads. Again, this is achieved by causing the rendezvous module to manipulate the table pointers in the same manner discussed earlier with reference to garbage collection and debugging, to ensure that the necessary consistent state is stored to the corresponding execution environments 12, 22, 32 prior to any switching between the threads taking place. This then ensures that the necessary state information is available for each Java thread when that Java thread is subsequently switched to by the Java VM 60.

In an alternative embodiment, the switching between threads is performed at the Java VM level, with the single occurrence of the Java VM being run on the operating system 100. In this embodiment, only one thread is running at a time. Hence, prior to garbage collection, there is no need to cause the rendezvous module 90 to manipulate the table pointer, since the single running thread is in a consistent state at the point that it requests garbage collection, and all stopped threads are also in a consistent state. However, where the rendezvous is caused external from the running thread, e.g. a debugger event, or the thread switch timer expiring, then the running thread needs to be brought to a consistent state by the rendezvous module 90 manipulating the table pointer.

Figure 3A:
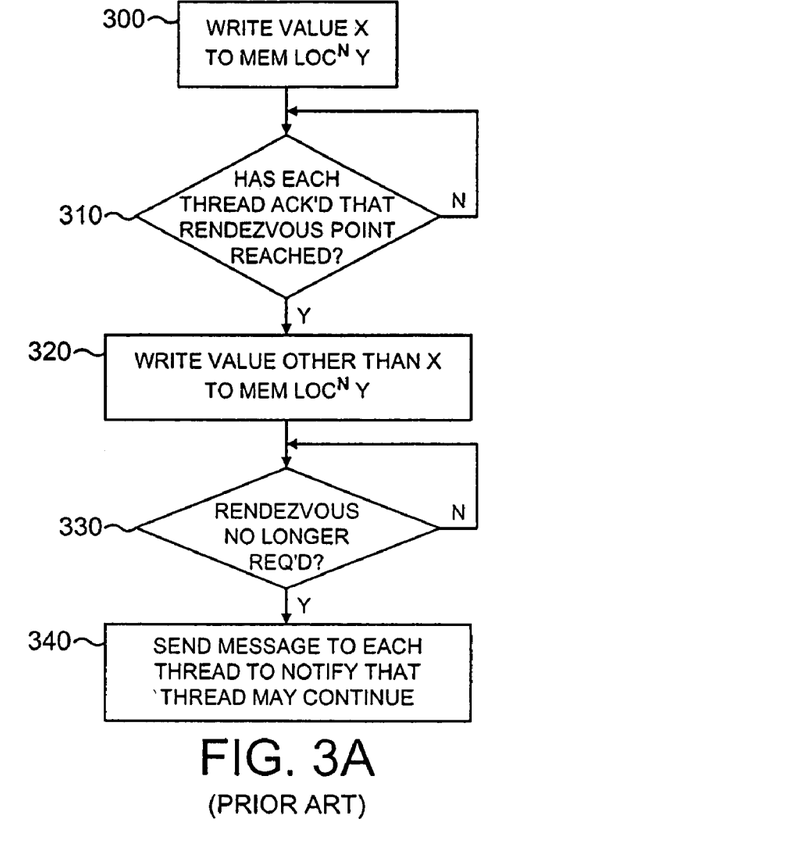
FIGS. 3A and 3B illustrate a prior art technique for invoking a rendezvous routine within the program threads.
Figure 3B:
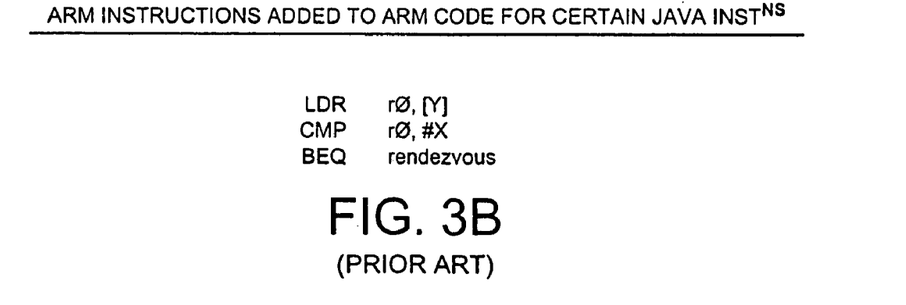

As described earlier, a prior art technique for invoking the rendezvous routine involved polling a memory location when executing certain Java bytecodes and conditionally branching to a rendezvous routine where the state of the corresponding thread could be written to its associated execution environment. This process is schematically illustrated in FIGS. 3A and 3B. Hence, when an event occurs that requires threads to be stopped, a value X is written to a memory location Y at step 300. For certain Java bytecodes, the corresponding sequence of native code instructions would include at the end the three instructions illustrated in FIG. 3B. The first instruction is a load instruction which loads the contents of memory location Y into register r0. The next instruction then compares the data in register r0 with the value X, and the final instruction then branches to the rendezvous routine if the previous compare instruction indicates that the contents of the register r0 are equal to the value X. As will be appreciated by those skilled in the art, these three instructions need to be executed every time the corresponding Java bytecodes are executed, and irrespective of whether the rendezvous routine is in fact required. Indeed, it is expected that the requirement for a rendezvous to be performed would be fairly infrequent, and accordingly the overhead of executing these three extra instructions every time the relevant Java bytecodes are executed represents a significant performance hit.

However, returning to FIG. 3, it can be seen that once step 300 has been performed, execution of those three instructions illustrated in FIG. 3B will cause the corresponding thread to branch to the rendezvous routine and perform that rendezvous routine. The rendezvous routine will basically cause the relevant state to be written to the thread's corresponding execution environment 12, 22, 32, and for the rendezvous module to then be notified that the rendezvous point has been reached for that thread.

Hence, at step 310, the rendezvous module awaits acknowledgements from each of the Java threads to confirm that that thread has reached the rendezvous point. If one of the Java threads is the instigator of the rendezvous request to the rendezvous module, then that particular thread will not need to send an acknowledgement, since, by initiating a rendezvous, it is implicitly acknowledging being at a consistent state.

Once each relevant thread has acknowledged that the rendezvous point has been reached (at step 310), the process proceeds to step 320, where a value other than X is written to the memory location Y. This will ensure that when the three instructions illustrated in FIG. 3B are subsequently executed, they will not cause a branch to the rendezvous routine. The process then proceeds to step 330, where an indication is awaited that the rendezvous is no longer required. This will typically be sent by the instigator of the rendezvous when that process has completed its relevant activity. Hence, the garbage collector 84 will notify the rendezvous module when it has finished garbage collection, the debug interface 65 will notify the rendezvous routine when the relevant debugging analysis has been performed, or in the event of thread switching within the Java VM 60, the Java VM will tell the rendezvous module once the switching process has been performed. At that point, the process proceeds to step 340, where a message is sent to each thread to notify them that they may continue executing under the control of the Java VM 60.

As discussed earlier, the main disadvantage with this prior art technique is that the three instructions illustrated in FIG. 3B need to be added to the native code sequences for a significant number of the Java bytecodes, and are executed every time those Java bytecodes are executed irrespective of whether a rendezvous is actually required. In one prior art implementation, the instructions in FIG. 3B were added to particular Java bytecode instructions, such as method invocation instructions, backwards branch instructions, etc, and hence the performance hit occurred every time such Java bytecode instructions were executed.

Figure 4:
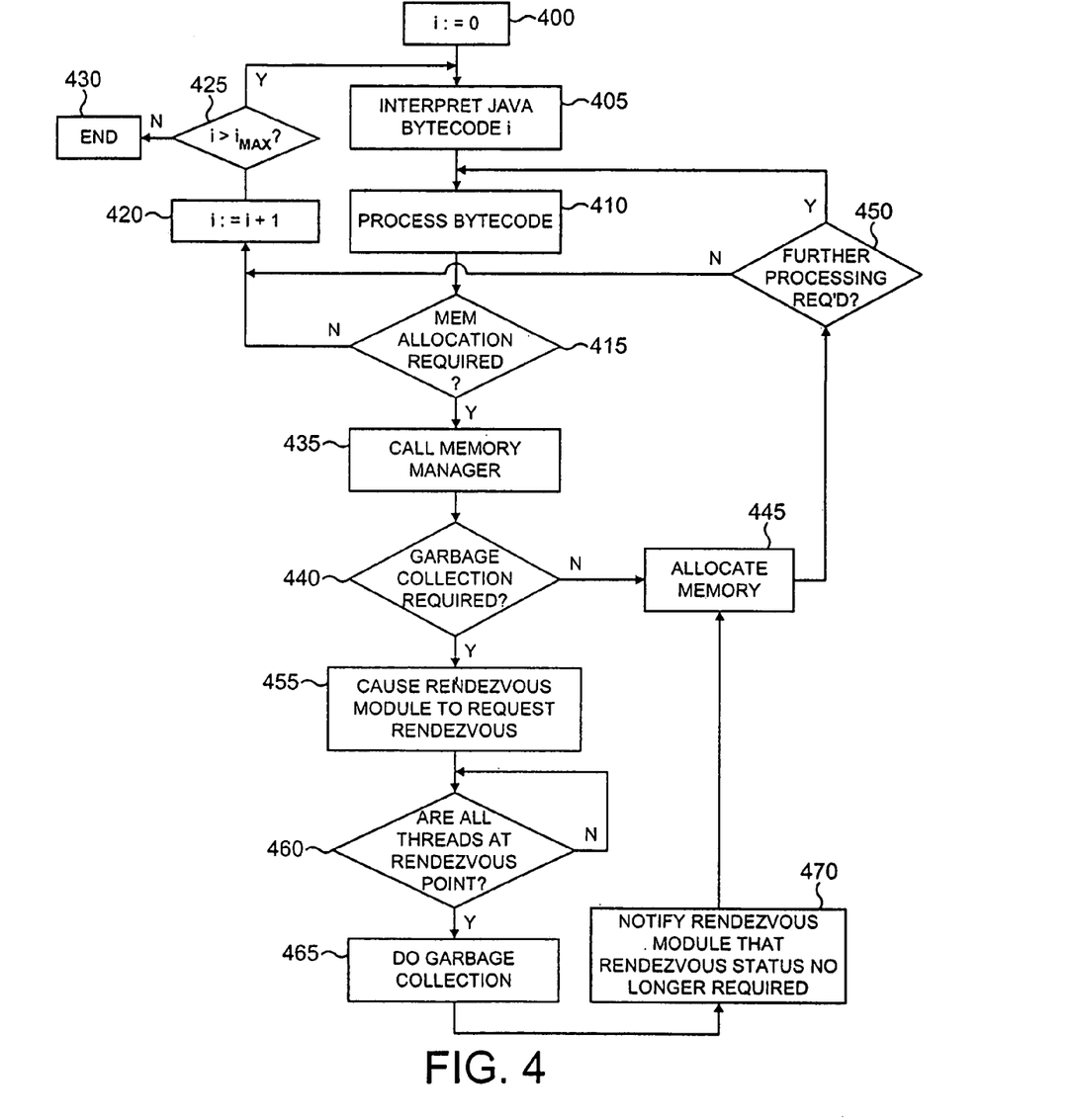
FIG. 4 is a flow diagram illustrating for the example of memory allocation a scenario in which the rendezvous routine needs to be invoked for the program threads.

Before discussing in detail the techniques used in preferred embodiments within the rendezvous module 90 to manage the rendezvous process, the example of garbage collection will be discussed in more detail with reference to FIG. 4, to illustrate when an event occurs that requires the rendezvous process to take place. At step 400, a variable "i" is set equal to zero, and then at step 405 Java bytecode i is interpreted by the interpreter 70 using the table as discussed earlier with reference to FIG. 2A or 2B. This then results in the bytecode being processed as a sequence of native instructions at step 410. At some point during such processing, it may be determined at step 415 that memory allocation within the data heap 40 is required.

If memory allocation is not required, and the bytecode processing has been completed, the process branches to step 420, where the value of i is incremented by one, after which it is checked that i does not exceed $i_{MAX}$. Assuming i does not exceed $i_{MAX}$, then the process returns to step 405 where the next Java bytecode is interpreted. Once it is determined that i does exceed $i_{MAX}$ at step 425, the process ends at step 430.

Assuming memory allocation is determined to be necessary at step 415, then the process proceeds to step 435, where the memory manager 80 is called. The memory manager 80 then determines at step 440 whether garbage collection is required. Assuming it is not (for example because there is still enough space in the data heap 40), then the process proceeds to step 445, where the memory is allocated, after which it is determined at step 450 whether any further processing of the current Java bytecode is required. If it is, the process returns to step 410, whereas if it is not, then the process proceeds to step 420.

If at step 440 it is determined that garbage collection is required, then the rendezvous module is caused to request a rendezvous at step 455. The processing performed by the rendezvous module in preferred embodiments of the present invention will be described in more detail later with reference to FIGS. 5 to 8. The process then proceeds to step 460, where the garbage collector 84 awaits confirmation that all relevant threads are at the rendezvous point. Once the rendezvous point has been reached, the process then proceeds to step 465 where the garbage collector performs the necessary garbage collection, after which the garbage collector then notifies the rendezvous module that the rendezvous status is no longer required (step 470). This enables the rendezvous module to notify all the threads that they can then continue their normal execution. Thereafter, the process proceeds to step 445, where the memory is allocated, and the remaining processing then continues as described earlier.

As will be appreciated by those skilled in the art, during debugging certain events may also occur that require the rendezvous module to be caused to request rendezvous. As an example, when a break point is reached in a particular thread, this will cause the debug interface 65 to inform the rendezvous module 90 that a rendezvous is required (this being an analogous step to step 455 illustrated in FIG. 4 for the garbage collection example). Similarly, in the event that the switching between threads is being managed by the Java VM 60, then when a thread switch is required (for example when a timer expires), then the Java VM 60 will inform the rendezvous module 90 that a rendezvous is required (again this step being equivalent to the step 455 illustrated in FIG. 4 for the garbage collection example). Further, it will be appreciated that in certain embodiments there may be other events that require the threads to be stopped, and these again will in preferred embodiments cause an appropriate call to the rendezvous module 90 to be made to invoke the rendezvous process.

Figure 5:
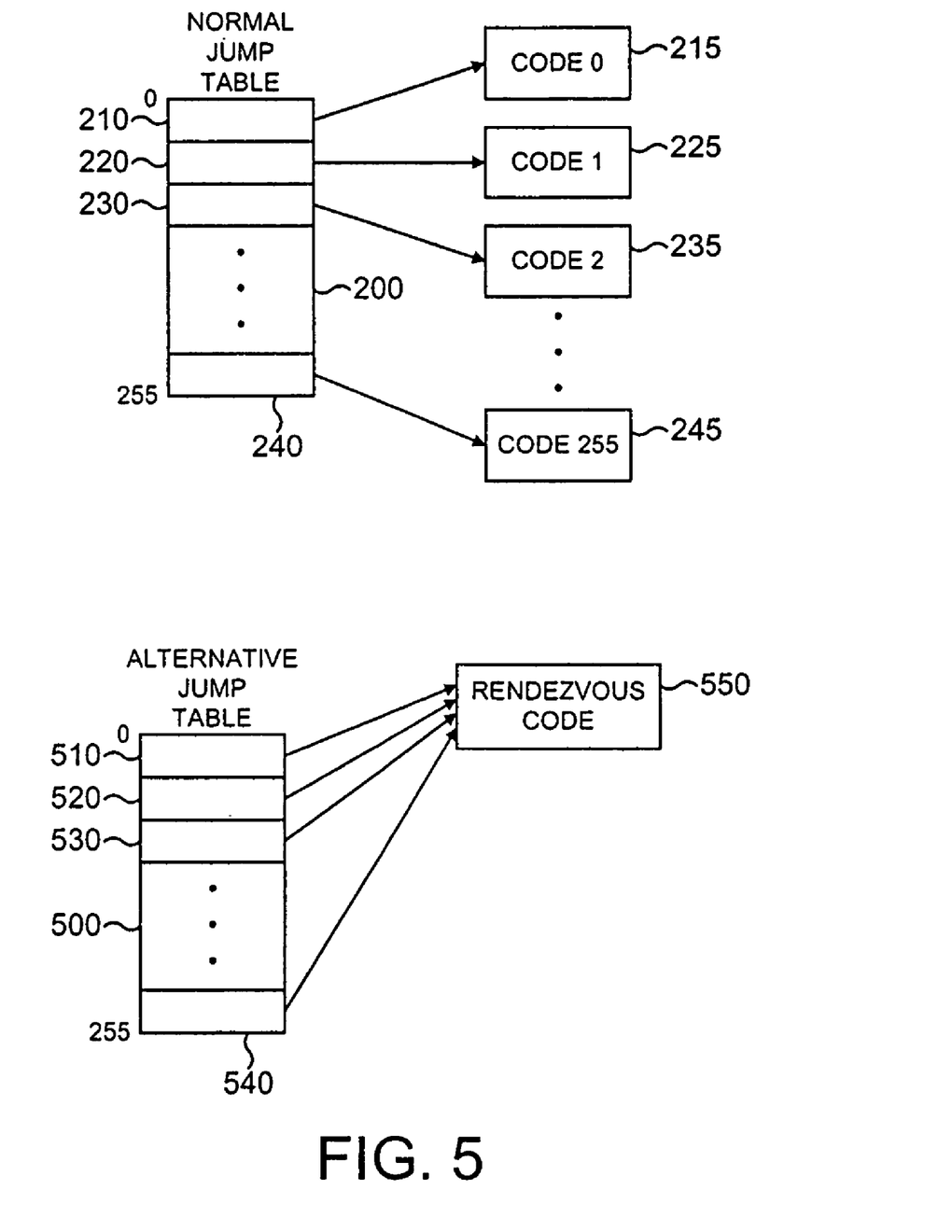
FIG. 5 is a diagram illustrating a first embodiment of the present invention, in which to enable the rendezvous routine to be invoked, the table used by the interpreter is replaced by an alternative table.
Figure 6A:
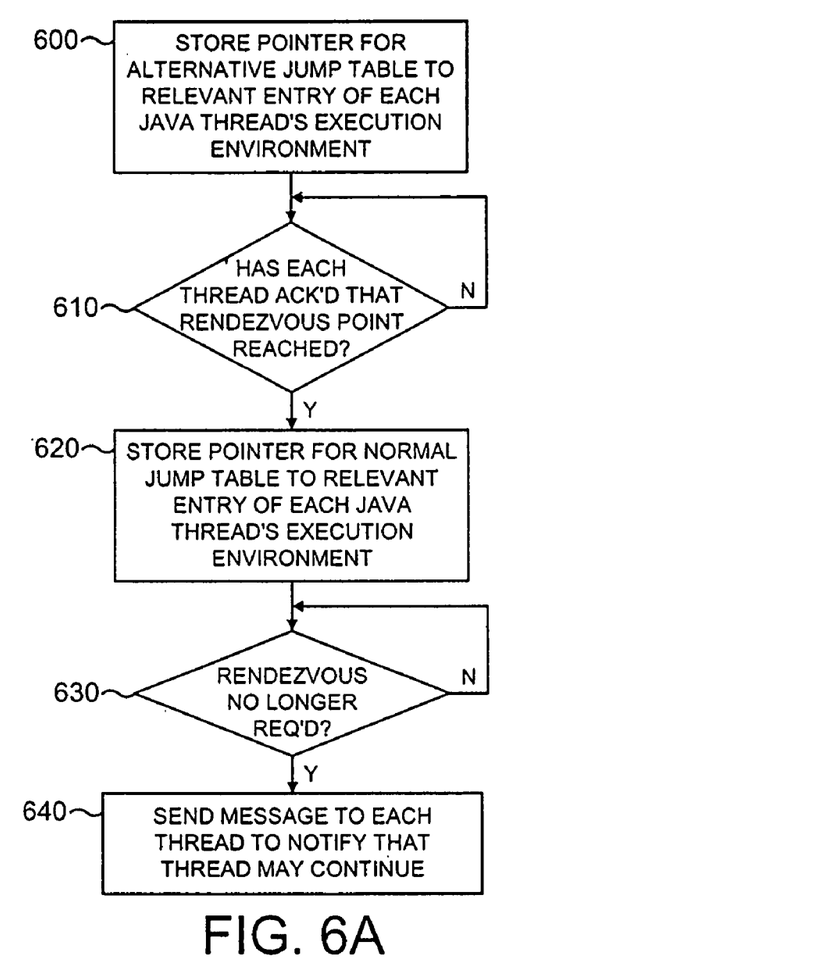
FIGS. 6A and 6B illustrate, for the embodiment of FIG. 5, the processing steps performed within the rendezvous module, and the additional instruction required to be added to certain native instruction sequences, to manage the rendezvous process.
Figure 6B:
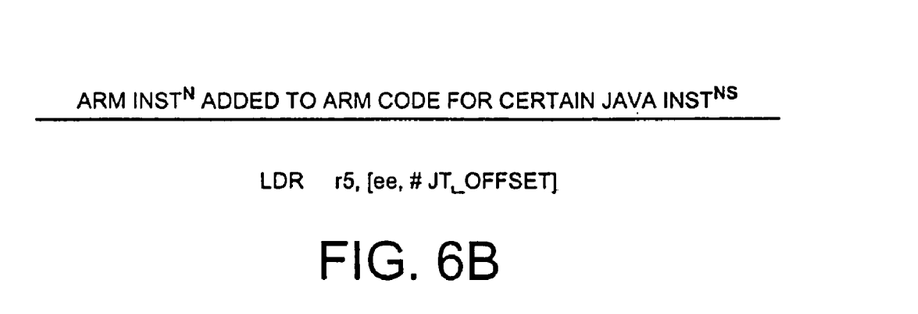

In embodiments where the interpreter 70 uses a jump table, FIGS. 5 and 6 will now be used to describe how the rendezvous process is preferably managed. As shown in FIG. 5, in addition to the normal jump table 200 that has already been discussed earlier with reference to FIG. 2A, an alternative jump table 500 is provided in which all of the entries 510, 520, 530, 540 point to the rendezvous routine 550. In such embodiments, the process preferably performed within the rendezvous module 90 when it is requested to invoke the rendezvous process is illustrated in FIG. 6A. At step 600, the table pointer for the alternative jump table 500 is stored to the relevant entry of each Java thread's execution environment 12, 22, 32. If the execution environments 12, 22, 32 will not have previously included such an entry, then they are modified to include as an entry an identification of the table pointer. Normally that entry would include the table pointer for the normal jump table, but as a result of step 600, that table pointer value will be overwritten within the relevant execution environments 12, 22, 32 with the table pointer for the alternative jump table. In preferred embodiments, all Java threads 10, 20, 30 will need to be stopped, and accordingly step 600 involves writing the table pointer for the alternative jump table to the relevant entry of each Java thread's execution environment 12, 22, 32.

In such preferred embodiments, the native code sequences for certain Java bytecodes (for example method invocation instructions, backwards branch instructions, etc) are modified to include as a last instruction the instruction illustrated in FIG. 6B. This instruction causes the final step of execution of such Java bytecodes to involve the loading into a particular register of the register bank 120 used to hold the table pointer the value stored in the relevant entry of the execution environment. In preferred embodiments, register r5 stores the table pointer, but it will be appreciated that any other register could be used depending on the implementation. The value "ee" identifies the register within the register bank that contains a pointer to a block of memory storing the execution environment for the thread currently being executed, and the value "JT_OFFSET" identifies the offset within that block of memory where the jump table pointer is stored. Hence, as a result of execution of that load instruction, the pointer for the alternative jump table as stored at step 600 will then be loaded into the relevant register of the processor core. The result of this is that when the interpreter 70 receives the next Java bytecode, it will automatically associate the rendezvous routine 550 with that Java bytecode, since as illustrated in FIG. 5, the entries for all Java bytecodes will point to that rendezvous routine once the alternative jump table is being used by the interpreter.

Figure 9:
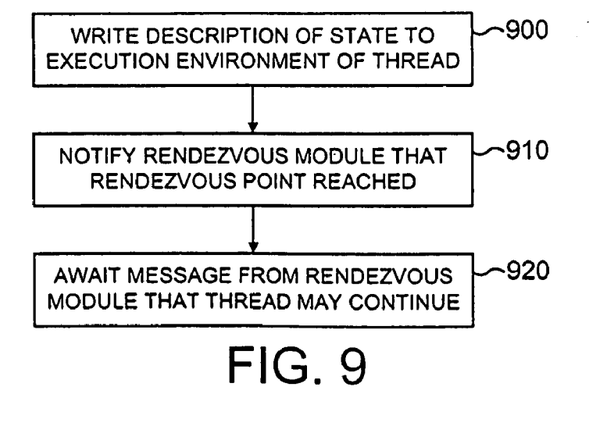
FIG. 9 is a flow diagram illustrating the steps performed by the rendezvous routine in accordance with preferred embodiments of the present invention.

The relevant thread will then execute the rendezvous routine, which is illustrated schematically in FIG. 9.

As illustrated in FIG. 9, the first step is to write the description of the state to the corresponding execution environment for the thread. At this point, it can be ensured that the state is at a consistent state, since the thread is at a position where one Java bytecode has completed execution, and the next Java bytecode has not yet begun to be executed. Once step 900 has been performed, then the rendezvous module is notified at step 910 that the rendezvous point has been reached. Thereafter, the relevant thread awaits at step 920 a message from the rendezvous module that that thread may continue with its execution under the control of the Java VM 60.

Hence, returning to FIG. 6A, it can be seen that at step 610 the rendezvous module awaits an acknowledgement from each of the Java threads that the rendezvous point has been reached. As is apparent from FIG. 9, this acknowledgement is issued by the relevant thread during the execution of the rendezvous process. Once each thread has acknowledged that the rendezvous point has been reached, the process then proceeds to step 620, where the pointer for the normal jump table is stored to the relevant entry of each Java thread's execution environment, thereby ensuring that any subsequent Java bytecodes are interpreted in accordance with the normal jump table. The rendezvous module 90 then awaits receipt at step 630 of an indication that the rendezvous is no longer required. As illustrated earlier with reference to FIG.

4, for the example of garbage collection, this notification will be sent at step 470 by the garbage collector once it has performed the necessary garbage collection. As will be appreciated by those skilled in the art, similar notifications could be issued by the instigators of any event that is requiring the threads to be stopped, for example by the debug interface 65 once the necessary debug analysis has been performed, by the Java VM 60 once the necessary thread switching has been performed, etc.

Once the rendezvous module 90 receives the indication that rendezvous is no longer required, it then proceeds to step 640, where it sends a message to each thread to notify those threads that they may continue execution under the control of the Java VM 60.

As is apparent from FIGS. 6A and 6B, the three instructions that needed to be added in accordance with the prior art technique described earlier with reference to FIGS. 3A and 3B have now been replaced by a single load instruction, and accordingly the performance hit that occurred in accordance with the prior art technique has now been significantly alleviated. As with the prior art technique, it is not necessary to insert this load instruction into every sequence of native code instructions, but instead the load instruction would typically only be inserted into the native code sequences for particular Java bytecode instructions, for example method invocation instructions, backward branch instructions, etc. However, given the lower overhead, it may be more practical to put the load instruction in more instruction sequences than used for the prior art "three instruction" implementation. For example, it may not be worth checking whether branches are backward branches, and instead it may be better to simply load the jump table pointer in all branch instructions.

Figure 7:
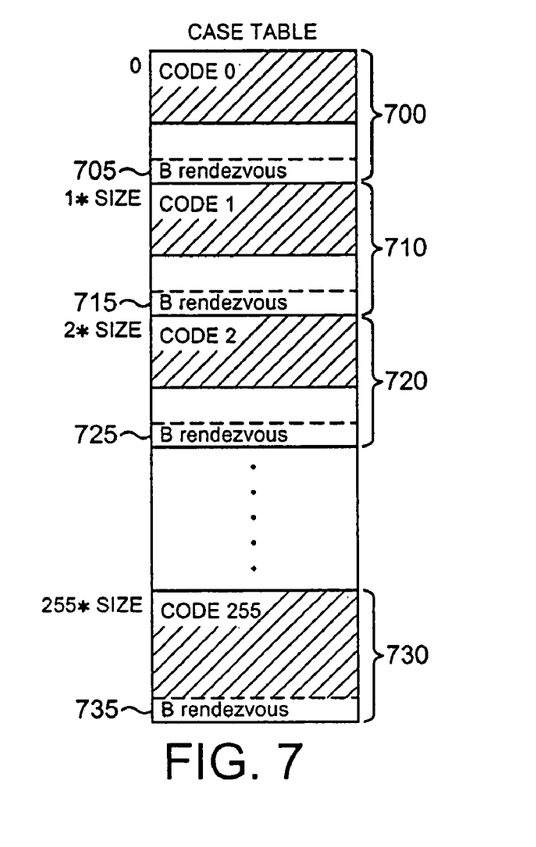
FIG. 7 is a diagram illustrating a second embodiment of the present invention, in which the table is modified to include within each block a branch to the rendezvous routine.

In embodiments where the interpreter 70 uses a case table rather than a jump table, FIG. 7 illustrates how the case table may be modified to facilitate activation of the rendezvous process as and when required. As shown in FIG. 7, each of the fixed sized blocks 700, 710, 720, 730 includes as a last entry a branch instruction 705, 715, 725, 735, respectively, which will cause a branch to the rendezvous routine. Taking the example where each of the blocks consists of 16 words, i.e. 64 bytes, the native code entries are restricted to 15 words, with the 16$^{th}$ word containing a branch to the rendezvous routine.

As will be appreciated by those skilled in the art, during normal operation, the branch instructions will never be reached, and accordingly the rendezvous routine will not be invoked. The process used by the rendezvous module 90 to ensure that the branch instruction 705, 715, 725, 735 are actioned in the event that the rendezvous routine is required will now be described with reference to FIGS. 8A and 8B. As with the jump table approach, the native instruction sequences for certain Java bytecode instructions will include as a last entry the load instruction illustrated in FIG. 8B, it being appreciated that this load instruction is the same as that discussed earlier with reference to FIG. 6B, and accordingly causes any modified table pointer to be loaded into the relevant register of the processor core following a change in that table pointer within the corresponding thread's execution environment.

Figure 8A:
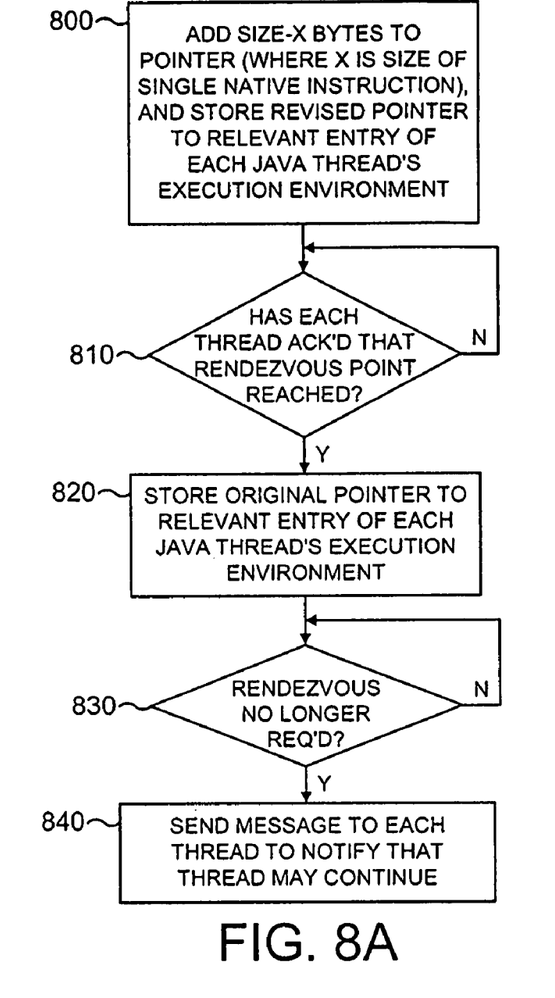
FIGS. 8A and 8B are diagrams illustrating, for the embodiment illustrated in FIG. 7, how the rendezvous module is arranged to modify the pointer to cause the rendezvous routine to be invoked, and illustrating the instruction added to the native instruction sequences for certain program thread instructions to cause the modified pointer to be used by the interpreter.
Figure 8B:
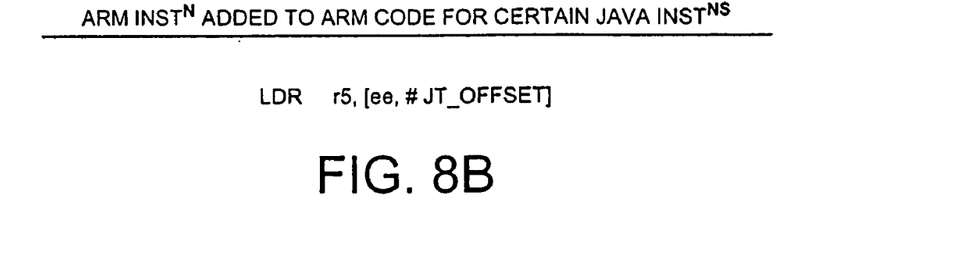

As illustrated in FIG. 8A, when the rendezvous module 90 is requested to invoke the rendezvous procedure, it is arranged at step 800 to add SIZE-X bytes to the table pointer value, where X is the size of a single native instruction, and SIZE is the number of bytes in each block of the case table. Hence, considering the example of ARM instructions, which are 4 bytes in length, this will involve adding SIZE-4 bytes to the table pointer. This revised table pointer is then stored to the relevant entry of each Java thread's execution environment in the same manner as discussed earlier with reference to FIG. 6A.

As mentioned earlier, when the interpreter 70 uses the case table to determine the native code sequence to be executed, it does this by adding n*SIZE to the table pointer, where n is an indication of the bytecode being analysed. Hence, as an example, for bytecode 2, prior to the case table pointer being modified, this would result in the interpreter pointing to a location at the beginning of native code 2 to cause native code 2 to be executed on the processor core. However, since the case table pointer has been modified by adding SIZE-4 bytes at step 800, this would now result in the interpreter pointing to the branch instruction 725 which will hence cause the processor core to branch to the rendezvous routine, this rendezvous routine being the rendezvous routine discussed earlier with reference to FIG. 9. Hence, it will be apparent that following step 800, and following execution of a Java bytecode in a particular Java thread which includes as its last native instruction the load instruction of FIG. 8B, then when the next Java bytecode is analysed by the interpreter, it will automatically cause a branch to the rendezvous routine to take place.

The process within the rendezvous module 90 then proceeds to step 810, where an acknowledgement that each thread has reached the rendezvous point is awaited. This is the same process step as described earlier with reference to step 610 of FIG. 6A. Once the necessary acknowledgements have been received, the process proceeds to step 820, where the original pointer value is then stored to the relevant entry of each Java thread's execution environment, thereby ensuring that when the interpreter analyses any subsequent Java bytecode, the appropriate native code sequence will be associated with that Java bytecode. The process then proceeds to steps 830 and 840, which are analogous to the steps 630 and 640 described earlier with reference to FIG. 6A.

Given the above description of preferred embodiments of the present invention, it will be appreciated that the techniques of preferred embodiments of the present invention, whereby the table pointers are manipulated by the rendezvous module 90 when a rendezvous is required, significantly alleviate the performance hit associated with the known prior art technique. In accordance with the embodiments of the present invention, the overhead for the check performed within the relevant native code sequences in scenarios where a rendezvous is not required is a maximum of one cycle (due to the presence of the load instruction described earlier with reference to FIGS. 6B and 8B), but the overhead in some instances is zero where the load can be scheduled in an interlock cycle.

Although a particular embodiment has been described herein, it will be apparent that the invention is not limited thereto, and that many modifications and additions thereto may be made within the scope of the invention. For example, various combinations of the features of the following dependent claims can be made with the features of the independent claims without departing from the scope of the present invention.

I claim:

1. A data processing apparatus for executing multiple program threads, each program thread comprising program thread instructions, the apparatus comprising:
    a processor core operable to execute native instructions;
    an interpreter means, during execution of each program thread for employing a table pointer to reference a table for determining from a current program thread instruction a sequence of native instructions to be executed by said processor core to effect execution of that current program thread instruction; and a consistency modules responsive to occurrence of a predetermined event, for causing the table pointer to said table to be manipulated, such that for a predetermined number of said program threads, the interpreter will be operable to associate a subsequent program thread instruction with a predetermined routine to be executed by the processor core, the predetermined routine being operable to cause the state of the corresponding program thread to be made available for subsequent reference.

2. A data processing apparatus as claimed in claim 1, wherein the table contains for each program thread instruction a code pointer pointing to a corresponding sequence of native instructions, and the consistency module is operable in response to occurrence of said predetermined event to cause the table pointer to be replaced by a table pointer to a replacement table, the replacement table containing for each program thread instruction a code pointer pointing to said predetermined routine.

3. A data processing apparatus as claimed in claim 1, wherein the table has for each program thread instruction a block containing the corresponding sequence of native instructions, each block further containing at a predetermined entry an instruction for branching to said predetermined routine, and the consistency module being operable in response to occurrence of said predetermined event to cause the table pointer to be modified so that when the interpreter subsequently references the table using the modified table pointer, the instruction for branching to said predetermined routine will be associated with the subsequent program thread instruction.

4. A data processing apparatus as claimed in claim 3, wherein the instruction for branching to said predetermined routine has a size of X bytes, the predetermined entry containing the instruction for branching to said predetermined routine is the final entry in each block, and the consistency module is operable to modify the table pointer by subtracting X bytes from the table pointer.

5. A data processing apparatus as claimed in claim 3, wherein the instruction for branching to said predetermined routine has a size of X bytes, the predetermined entry containing the instruction for branching to said predetermined routine is the final entry in each block, each block has a size of Y bytes, and the consistency module is operable to modify the table pointer by adding Y-X bytes to the table pointer.

6. A data processing apparatus as claimed in claim 1, wherein each of the program threads share a data heap, and the predetermined event is the determination that a garbage collection process is required to be performed upon said data heap.

7. A data processing apparatus as claimed in claim 1, wherein switching between said program threads is performed by software associated with the interpreter, and the predetermined event is the requirement for a switch between program threads.

8. A data processing apparatus as claimed in claim 7, wherein the predetermined event occurs upon expiry of a timer.

9. A data processing apparatus as claimed in claim 1, further comprising a debug interface for interfacing with a debugging application, and the predetermined event is a debug event that requires access to the state of one or more of the program threads.

10. A data processing apparatus as claimed in claim 1, wherein each program thread has associated therewith an execution environment stored in memory external to the processor core and the predetermined routine is operable to cause the state of the corresponding program thread to be stored from registers of the processor core to the execution environment.

11. A data processing apparatus as claimed in claim 1, wherein the program thread instructions are Java bytecodes.

12. A data processing apparatus as claimed in claim 11, wherein the interpreter is provided within a Java Virtual Machine arranged to be executed on the processor core.

13. A data processing apparatus as claimed in claim 12, wherein the processor core has a set of registers in which to store data required by the processor core, a subset of these registers being allocated for storing data relating to the Java Virtual Machine, and the state to be made available for subsequent reference comprises the contents of said subset of registers.

14. A method of operating a data processing apparatus to execute multiple program threads, each program thread comprising program thread instructions, the apparatus having a processor core operable to execute native instructions, and the method comprising:

(i) during execution of each program thread, employing a table pointer to reference a table to determine for a current program thread instruction a sequence of native instructions to be executed by said processor core to effect execution of that current program thread instruction; and (ii) responsive to occurrence of a predetermined event, manipulating the table pointer to said table, such that for a predetermined number of said program threads, subsequent iterations of said step (i) will cause a subsequent program thread instruction to be associated with a predetermined routine to be executed by the processor core, the predetermined routine being operable to cause the state of the corresponding program thread to be made available for subsequent reference.

15. A method as claimed in claim 14, wherein the table contains for each program thread instruction a code pointer pointing to a corresponding sequence of native instructions, and said step (ii) comprises replacing the table pointer by a table pointer to a replacement table, the replacement table containing for each program thread instruction a code pointer pointing to said predetermined routine.

16. A method as claimed in claim 14, wherein the table has for each program thread instruction a block containing the corresponding sequence of native instructions, each block further containing at a predetermined entry an instruction for branching to said predetermined routine, and said step (ii) comprises modifying the table pointer so that when subsequently at said step (i) the table is referenced using the modified table pointer, the instruction for branching to said predetermined routine will be associated with the subsequent program thread instruction.

17. A method as claimed in claim 16, wherein the instruction for branching to said predetermined routine has a size of X bytes, the predetermined entry containing the instruction for branching to said predetermined routine is the final entry in each block, and said step (ii) comprises modifying the table pointer by subtracting X bytes from the table pointer.

18. A method as claimed in claim 16, wherein the instruction for branching to said predetermined routine has a size of X bytes, the predetermined entry containing the instruction for branching to said predetermined routine is the final entry in each block, each block has a size of Y bytes, and the consistency module is operable to modify the table pointer by adding Y-X bytes to the table pointer.

19. A method as claimed in claim 14, wherein each of the program threads share a data heap, and the predetermined event is the determination that a garbage collection process is required to be performed upon said data heap.

20. A method as claimed in claim 14, wherein switching between said program threads is performed by software associated with software used to perform said step (i), and the predetermined event is the requirement for a switch between program threads.

21. A method as claimed in claim 20, wherein the predetermined event occurs upon expiry of a timer.

22. A method as claimed in claim 14, further comprising the step of performing debugging, and the predetermined event is a debug event that requires access to the state of one or more of the program threads.

23. A method as claimed in claim 14, wherein each program thread has associated therewith an execution environment stored in memory external to the processor core and the predetermined routine is operable to cause the state of the corresponding program thread to be stored from registers of the processor core to the execution environment.

24. A method as claimed in claim 14, wherein the program thread instructions are Java bytecodes.

25. A method as claimed in claim 24, wherein said step (i) is performed by an interpreter provided within a Java Virtual Machine arranged to be executed on the processor core.

26. A method as claimed in claim 25, wherein the processor core has a set of registers in which to store data required by the processor core, a subset of these registers being allocated for storing data relating to the Java Virtual Machine, and the state to be made available for subsequent reference comprises the contents of said subset of registers.

27. A computer program product carrying a computer program for controlling a computer to perform the method of claim 14.

\* \* \* \* \*